United States Patent [19]

Hayne

[11] 4,413,438
[45] Nov. 8, 1983

[54] FLOATABLE FLY CASTING WEIGHT AND LEADER STORAGE DEVICE

[76] Inventor: Hank Hayne, 634 N. Shore, Parkville, Mo. 64151

[21] Appl. No.: 260,323

[22] Filed: May 4, 1981

[51] Int. Cl.³ .............................................. A01K 93/00
[52] U.S. Cl. ..................................... 43/43.11; 43/57.1
[58] Field of Search ................... 43/44.83, 43.11, 57.1, 43/57.2

[56] References Cited

U.S. PATENT DOCUMENTS

| | | |
|---|---|---|
| 1,320,570 | 11/1919 | Reynolds . |
| 1,764,738 | 6/1930 | Marsters . |
| 1,915,208 | 6/1933 | Walthers . |
| 2,510,769 | 6/1950 | Berry . |
| 2,554,318 | 5/1951 | Wardrip et al. . |
| 2,592,441 | 4/1952 | Louthan ............... 43/43.11 |
| 2,609,633 | 9/1952 | Cracker . |
| 2,683,323 | 7/1954 | Dudley . |
| 2,775,056 | 12/1956 | Sneed . |
| 2,883,773 | 6/1959 | Hudkins ............... 43/43.11 |
| 2,887,816 | 5/1959 | Hudkins . |
| 3,577,669 | 5/1971 | Johnson . |
| 3,832,797 | 9/1974 | Smedley . |
| 3,848,354 | 11/1974 | Hustad . |
| 3,878,636 | 4/1975 | George . |

FOREIGN PATENT DOCUMENTS 524715   5/1956   Canada ............................... 43/43.11

Primary Examiner—Nicholas P. Godici
Assistant Examiner—Richard K. Seidel
Attorney, Agent, or Firm—Litman, Day & McMahon

[57] ABSTRACT

A floatable fly casting weight and leader storage device is provided having a substantially cylindrical body and opposing end faces. Eyelets extend axially from both end faces to allow wrapping of a leader longitudinally around the device. The front end face is beveled to reduce ripples when moving relative through the water and to facilitate the wrapping of the leader thereon. The rear face includes a planar surface normal to an axis of the device to increase the hook setting ability of the device and a planar surface oblique to the end face to facilitate the wrapping of the leader thereon.

10 Claims, 6 Drawing Figures

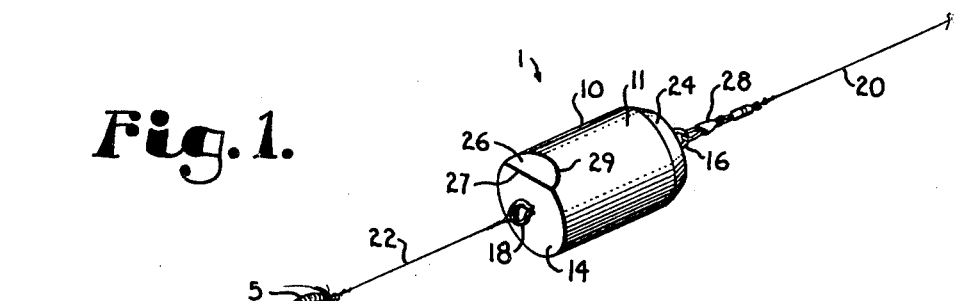
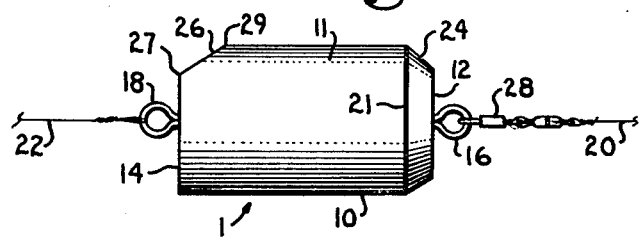
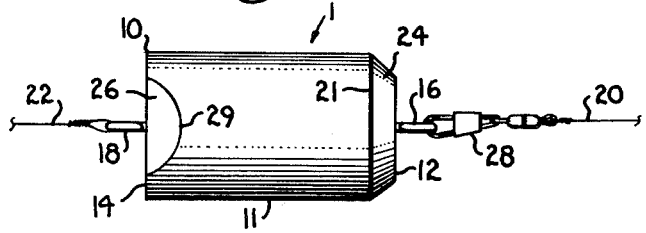
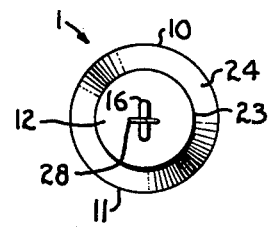
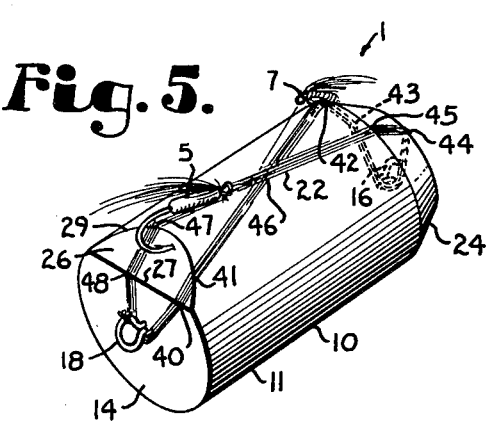
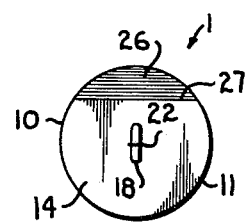

FLOATABLE FLY CASTING WEIGHT AND LEADER STORAGE DEVICE

BACKGROUND OF THE INVENTION

This invention relates to fishing devices in general and in particular to devices used to aid in casting a fishing lure and storing of a leader thereon when not being used for fishing.

It is well known in fishing that small, lightweight artificial lures such as flies are excellent lures to catch a variety of fish. Because of the light weight of flies, which usually only incorporate a hook with hair or tinsel tied thereon, it is usually necessary to add weight to the fisherman's line to allow the fisherman to cast the fly when using a casting rod and reel as opposed to a fly rod. Such weighting is undesirable in certain situations, particularly those wherein the fisherman desires to fly to be fished at or near the surface of the water. In particular, when a nonfloatable weight is added to the fisherman's line, the lure is urged to sink to the bottom.

It is further desirable that a fisherman have the ability to change the fly or lure he is using without having to retie a knot. This occurs when a fisherman desires to rapidly change the lure he is using to ascertain upon what the fish are feeding and in situations where, either because of low light conditions or cold weather, it is physically difficult for the fisherman to continually retie knots.

Examples of prior devices to aid fisherman in casting a lure have been very cumbersome to operate and exhibited many surface irregularities so as to be prone to spook or scare a fish when being used. Further, other examples of the prior art have not provided means to allow a leader of the lure to be easily stored thereon. Such storage capabilities are desirable, since the fisherman often has numerous lures which he rigs prior to going fishing, such that he may quickly and conviently choose from any of the lures and use same with a minimum of manipulation.

OBJECTS OF THE INVENTION

Therefore, the principal objects of the invention are: to provide a floatable fly casting weight and leader storage device; to provide such a floatable device which has a substantially cylindrical body and has front and rear opposing end faces; to provide such a device having at the intersection between the front end face and the cylindrical body a ripple reducing means; to provide such a device having between the rear end face and the cylindrical body a planar surface to aid in wrapping a leader attached to the rear face around the body for storage; to provide such a device having eyelets which extend axially from both end faces to further facilitate wrapping of a leader thereon; to provide such a device having hook setting means on the rear end face to facilitate hooking of a fish; to provide such a device which is easily mass produced and mass rigged; to further provide such a device which is simple in design, easy to manufacture, durable in use and particularly well adapted for its intended usage thereof.

Other objects and advantages of this invention will become apparent from the following description taken in connection with the accompanying drawings wherein are set forth by way of illustration and example certain embodiments of this invention.

SUMMARY OF THE INVENTION

A floatable fly casting weight and leader storage device is provided for casting lightweight lures by a casting outfit.

By way of explanation, a casting outfit is a rod and a reel combination wherein, when a fisherman rotates his rod forward so as to effectuate a cast, the momentum of tackle, such as lures, sinkers, corks, etc., propels the tackle outwardly while stripping line from the fisherman's reel. A reel used in casting could be a casting reel, a bait casting reel, a spinning reel or a spin cast reel. Each has a different design but all entail stripping of line from the reel during a cast. A casting outfit is not a fly fishing outfit wherein during a cast only that line which is stripped from the reel by the fisherman prior to the cast, is propelled by the cast. Fly rods are typically long and limber so as to allow a fisherman to whip the line already stripped from the reel in a back and forth action, called false casting, thereby imparting momentum to the fishing line and hence any lures attached thereto. Fly rods are particularly capable of casting lightweight lures but are cumbersome because of their length and, because of the necessity of making false casts prior to the actual casting of a lure, they are incompatible with certain fishing situations such as when there are trees or the like present which would foul the fisherman's line during a back cast portion of the false cast.

The device according to the present invention comprises a generally cylindrical body member, preferably having no surface irregularities except as herein set out and preferably being made of cork, appropriate plastic or wood. The body member has opposing end faces from which eyelets extend axially allowing a leader to be attached to a rear face of the body and a fishing line to be attached to a front face of the body. Preferably, the faces are perpendicular to an elongate axis of the body member.

A ripple reduction means is provided at the front of the body member and comprises a beveled surface which extends between the body member surface and front end surface. In particular, the beveled surface defines a truncated cone having a base of equal diameter to the diameter of the cylindrical body member. The ripple reduction means allows the device to be moved through the water with a minimal amount of production of ripples. This is very desirable when fishing for certain species of fish, such as trout, which are very easy to spook or scare.

Associated with the rear face of the body is a generally planar surface which intersects the rear surface and the body member cylindrical surface. Preferably, the planar surface is oblique to the rear surface, intersecting the latter intermediate the body axis and an outer edge of a projected intersection of the rear face with the body member cylindrical face. Such a planar surface allows a leader attached to the device to be wrapped longitudinally about the device in an easy manner and in a manner which will prohibit inadvertent unwinding of the leader. Such wrapping allows easy storage of rigged devices such that same can be easily unwrapped and utilized in the dark or extreme cold.

The rear face of the body member is disposed in a plane substantially normal to a longitudinal axis of the body member and, as such, functions as a hook setting means. Typically, when a fish strikes or attacks a lure, he will retreat drawing the lure through the water. Since the lure is attached to the device by the leader and the leader is attached to the device at a leader attachment eyelet which is centrally located on the end face, the end face will remain normal to the line of motion of the device as the fish retreats providing resistance to the movement of the device through the water. This will enhance the chance of a fisherman setting the hook in the mouth of the fish and, on some occasions, such as with trout or crappie which have very delicate mouths, might produce enough resistance on the lure to set the hook in the mouth of the fish without action by the fisherman The leader can be stored on the device when not in use by snugly wrapping the leader in a figure eight fashion around the front and rear eyelets with the hooks of the lure being imbedded in the device to retain the leader thereon. In doing so, the leader will contact the rear beveled surface at two points of contact. Since the distance between the front and rear eyelets increases as the points of contact extend outwardly on the planar surface, the leader is substantially prevented from inadvertent unwinding.

The drawings constitute a part of this specification and include exemplary embodiments of the present invention and illustrate various objects and features thereof.

BRIEF DESCRIPTION OF THE DRAWINGS

FIG. 1 is a perspective view of a fly casting weight and leader storage device according to the present invention showing a leader and two lures attached thereto.

FIG. 2 is an enlarged side elevational view of the device.

FIG. 3 is an enlarged top elevational view of the device.

FIG. 4 is an enlarged front end view of the device.

FIG. 5 is an enlarged perspective view of the device showing a leader with two lures attached thereto wrapped around the device.

FIG. 6 is an enlarged rear end view of the device.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a fly casting weight and leader storage device according to the present invention. The device 1 is used to facilitate the casting of a lightweight lure 3 such as flies 5 and 7 by use of a casting rod (not shown). Further, the device is designed to float on the water as same is preferably constructed of material, such as said cork, appropriate plastic or wood, which is of lesser density than water.

As shown in FIG. 1, the device includes a solid and generally cylindrical body 10 having a front end face 12 and a rear end face 14. A cylindrical surface 11 of the body 10 is preferably smooth and without irregularities except as herein noted. Line attachment means such as eyelets 16 and 18 are provided on the front and rear faces respectively. Eyelet 16 allows a leader 22 having a desired fish bait or lure such as the aforementioned flies 5 and 7 to be attached to the device 1. As shown in FIG. 1, there are two flies 5 and 7, but it is understood that this device could be used with any type of suitable lure including a variety of artificial and natural baits. Eyelet 18 allows the device to be attached to a fishing line 20 which leads to a casting rod and reel of a fisherman (not shown). As shown in the drawings, the eyelets 16 and 18 extend axially with respect to the body 10 and generally from the center of the front and rear faces 12 and 14 respectively.

The front face 12 comprises a substantially planar surface. Provided with the body 10 adjacent the front face 12 is a ripple reducing means such as beveled surface 24. As shown in the drawings, the beveled surface 24 extends completely around the edge of the front end face 12 defining a truncated cone. Further, the beveled surface 24 intersects the body member cylindrical surface 11 at a curved line 21 and the front face 12 at a curved line 23. The rear face 14 also comprises a substantially planar surface and is substantially normal to a longitudinal axis of the body.

Included on the body 10 so as to intersect with the rear face 14 is a leader wrapping aid means such as oblique planar surface 26. It is seen that the planar surface 26 is angled with respect to a longitudinal axis of the device cylindrical body 10 and intersects both the rear end face 14 and the cylindrical body 10. The planar surface 26 further intersects the rear face 14 along a preferably straight line 27 and the body member cylindrical surface 11 along a curved line 29. The rear face intersection line 27 is located between a center of the rear face 14 and the cylindrical surface intersection line 29 preferably such that less than one half of the rear face 14 is affected by the positioning of the planar surface 26.

The rear end face 14 further functions as a hook setting means which will be explained presently.

In use, the device 1 is used to enable a fisherman to cast lures of which are relatively light weight by a casting outfit, which lures the fisherman would normally be unable to cast without the aid of additional weight. In using the device, the fisherman will secure a selected lure, such as the flies 5 and 7, to a leader line 22, as shown in FIG. 1. The fisherman will then attach the leader 22 to the rear surface eyelet 18. The fisherman will similarly attach the device 1 to the fishing line 20 which leads to his reel (not shown). As shown, the connection between the device 1 and the fishing line 20 is preferably by means of a snap swivel 28 which allows the fisherman to connect and/or remove the device 1 from his fishing line 20 without necessitating the retying of a knot. Although a snap swivel 28 is shown here, it is anticipated that other connecting tackle could be utilized to secure the device 1 to the fishing line 20 including the tying of a knot. After the device 1 is securely attached to the fishing line 20, the device is then used to aid the fisherman to cast the small weight of the lures 5 and 7.

The device 1 is floatable and when in floating position in the water, the front beveled portion 24 functions to reduce perturbations in the water such as ripples caused by the device 1 moving relative to the water as when being pulled therethrough. This is important, especially when fishing for certain species such as trout which are most readily caught on small lures such as the files 5 and 7 but are extremely jittery with respect to unusual disturbances in the water such that they will not be likely to strike at lures when such ripples occur nearby. To further reduce any tendency to spook or scare fish, the device 1 is preferably fabricated of a natural substance such as wood or cork so that the device will look as natural as possible, for instance, like a floating piece of tree branch.

Since the rear end surface 14 is substantially flat and positioned so as to be normal to the longitudinal axis of the device cylindrical body 10, rearward movement of the device is resisted, for example, as when the lures are attacked or struck by a fish. As such, the rear end face surface 14 acts as a hook setting means to aid in the setting of the hook in the fish.

Further, since the rear eyelet 18 extends axially from the device 1, the rear end face surface is held substantially normal to any force exerted by a fish thereby increasing the hook-setting potential of the rear end face surface 14.

If the fisherman desires to store the flies 5 and 7 which he is using or if he wants to prerig multiple devices for a later fishing trip, he can use the device 1 as a leader storage device. As shown in FIG. 5, the leader 22 can be snugly wrapped around the device 1 and stored thereon until the next usage. An example of a method in storing the leader 22 would be as shown in FIG. 5 where the leader 22 is wrapped around the first and rear eyelets 16 and 18 in a figure eight position. The leader 22 is first wrapped over the rear oblique surface 26 contacting the rear face intersection line 27 and rear body member surface intersection line 29 generally at points 40 and 41 respectively. The leader 22 is then wrapped over the body surface 11, front beveled surface 24 and around the front eyelet 16, engaging the front body member surface intersection line 21 and front face intersection line 23 generally at points 42 and 43 respectively. It is noted that contact points 42 and 43 are on opposite sides of a line extending between front and rear eyelets 16 and 18 as contact points 40 and 41. After the leader is wrapped around the front eyelet 18, it is then wrapped over the front face 12, front beveled surface 24 and body member surface 11 crossing over itself near a central portion of the body member 10 such as at point 46. The leader 22, as it is wrapped over the front beveled surface 24 contacts the front face intersection line 23 and front body surface intersection line at points 44 and 45 respectively. After the leader crosses over itself at point 46 it is wrapped over the rear oblique surface 26, rear face 14 and around the rear eyelet 16, contacting the rear body intersection line 29 and rear face intersection line 27 at points 47 and 48 respectively. It is further noted that points 47 and 48 are on opposite sides of a line extending between eyelets 16 and 18 as points 44 and 45. This completes one full figure eight wrap. This figure eight wrapping is repeated until enough leader 22 is wrapped around the device 1 to present the lures 5 and 7 successively to the device 1. Since the device 1 is preferably fabricated of cork, appropriate plastic or wood, a hook barb of the lures 5 and 7 can then be easily implanted into the device 1 respectively and stored thereon. It is noted that the leader 22 is preferably snugly wrapped around the device 1.

It is seen that if the leader 22 is wrapped snugly in this manner the rear oblique surface 26 will prohibit the leader 22 from coming inadvertently unwound when the lure barbs are securely implanted into the device. This occurs because the distance between the front and rear eyelets 16 and 18, and hence the length of leader 22 needed to span such eyelets is increased as the points of contact of the leader 22 with the rear oblique surface 26 moves outwardly along the edge of intersection between the face 14 and oblique surface 26. The substantially nonresilient nature of the leader 22 further resists such an outward extension of the point of contact between the leader 22 and the oblique surface 26, thereby substantially prohibiting any inadvertent unwinding of the leader from the device 1. It is noted that if there was no oblique surface 26, the circular shape of the rear face 14 would allow the leader 22 to unwind if wrapped about the body 10 in the manner described.

By having a plurality of devices 1 in a tackle box and using the leader storing capability thereof, a fisherman could tie, on several such devices 1, a suitable combination of potentially productive lures and thereafter, while fishing, quickly change the lure presently being used to find that lure which is right for the present fishing situation. It is noted that the buoyant nature of the device 1 allows same to float on the surface of the water and be recovered by a fisherman even if the fishing line 20 is broken.

It is to be understood that while certain embodiments of the present invention have been illustrated and described herein, it is not to be limited to the specific forms or arrangement of parts described and shown.

What is claimed and desired to secure by Letters Patent is:

1. A floatable fishing leader storage device comprising:
   (a) an elongate body member having a first end and a second end and a density less than water;
   (b) first and second attachment means extending generally in an axial manner from said first and said second ends respectively; said second attachment means adapted to secure an assembly including a leader, a lure and a hook to said storage device second end; and
   (c) leader wrapping means positioned on said device second end to facilitate the wrapping of said leader about said device when said device is detached from an associated fishing line; said leader wrapping means comprising said first and second attachment means and an outwardly facing surface formed between and intersecting said device body member and said second end; said surface being generally planar and oblique to said second end and generally semi-elliptical in shape.

2. A device as set forth in claim 1 wherein:
   (a) said device body member has a generally cylindrical outer surface; and
   (b) said cylindrical outer surface is substantially smooth and without surface irregularities.

3. A device as set forth in claim 1 wherein:
   (a) said first and second ends are planar surfaces and are substantially normal to a longitudinal axis of said device body member.

4. A floatable fishing lure casting aid and leader storage device for use with a spinning reel and rod having a fishing line extending therefrom; said device comprising:
   (a) an elongate body member having a first end and a second end;
   (b) first and second attachment means connected to said first and second ends respectively; said first attachment means adapted to secure the fishing line to said device; said second attachment means adapted to positively secure an assembly including a leader, a lure and a hook to said second end when said aid is being drawn through water;

(c) hook setting means provided with said second end; said hook setting means comprising a generally flat surface on said second end positioned in a plane substantially normal to a longitudinal axis of said cylindrical body member and also positioned so as to act against water in such a manner as to oppose a rearward force on the leader; said second attachment means being generally centrally disposed on said second end flat surface; and (d) leader wrapping means positioned on said device second end to facilitate the wrapping of said leader about said device when said device is detached from the fishing line; said leader wrapping means comprising a generally planar, outwardly facing surface obliquely positioned relative to said second end and intersecting said body member and said second end and generally semi-elliptical in shape.

5. The device as set forth in claim 4 wherein:
(a) said body member has a generally smooth and cylindrical surface.

6. The device as set forth in claim 4 wherein:
(a) said first end includes a substantially flat surface; and further including:
(b) ripple reducing means comprising a beveled surface positioned between said first end surface and said body cylindrical surface and totally therearound and resulting from the revolution of a generally linear curve aligned at an outer angle to a longitudinal axis of said body member so as to define a substantially truncated conical shaped nose portion having a base diameter substantially equal to a diameter associated with said body member.

7. The device as set forth in claim 4 wherein:
(a) said leader wrapping means planar surface intersects with said second end intermediate said second attachment means and said cylindrical surface; said planar surface also being generally oblique to an axis associated with said cylindrical surface.

8. A device as set forth in claim 7 wherein:
(a) said first and second line attachment means comprise first and second eyelets respectively; each of said eyelets protruding axially from said first and second ends respectively such that said leader can be securely wrapped around said eyelets and over said body member surface in a figure eight fashion and thereby be substantially prevented from inadvertent unwinding; said planar surface and said second end intersecting in a generally linear edge which is normal to said cylindrical surface axis and is spaced from both said first and second eyelets.

9. A floatable fishing lure casting aid and leader storage device comprising:
(a) an elongate cylindrical body member characterized by the ability to be floatable in water having first and second ends; each end comprising a substantially flat surface normal to a longitudinal axis of the body member; said body member having a cylindrical surface;
(b) first and second eyelets extending outward and generally along said axis from said first and second end surfaces near a center thereof respectively, said second eyelet adapted to attach a leader to the device;

(c) ripple reducing means provided with said first end and comprising a beveled surface extending between said body cylindrical surface and said first end surface and totally therearound, and resulting from the revolution of a generally linear curve aligned at an outer angle to a longitudinal axis of said body member so as to define a substantially truncated cone; and (d) leader wrapping means positioned adjacent said second end to facilitate the wrapping of an associated leader about said device; said leader wrapping means comprising a planar, outwardly facing surface positioned obliquely to said second end and intersecting said second end and said body cylindrical surface; the intersection of said leader wrapping means planar surface with said second end defining a generally linear edge which is positioned between a center of said second end and said body cylindrical surface; said edge being generally perpendicular with respect to said body member axis; said planar surface being generally semi-elliptical in shape.

10. A floatable fishing lure casting aid and leader storage device comprising:
(a) an elongate cylindrical body member characterized by the ability to be floatable in water and having first and second ends; each end comprising a substantially flat surface normal to a longitudinal axis of the body member; said body member having a cylindrical surface;
(b) a fishing line leader adapted to be attached to a fishing lure;
(c) first and second eyelets extending outwardly and generally along said axis from said first and second end surfaces near a center thereof respectively, said leader attached to said second eyelet;
(d) a ripple reducing means provided with said first end and comprising a beveled surface formed by the rotation of a generally linear curve about said body member and at an acute angle thereto; said beveled surface extending between said body cylindrical surface and said first end surface and totally therearound so as to define a substantially truncated cone; and
(e) a leader wrapping means positioned adjacent said second end to facilitate the wrapping of said leader about said device; said leader wrapping means comprising said first and second eyelets and a planar, outwardly facing surface positioned obliquely to said second end and intersecting said second end and said body cylindrical surface; the intersection of said leader wrapping means planar surface with said second end defining a generally linear edge which is positioned between a center of said second end and said body cylindrical surface; said edge being spaced from and generally perpendicular with respect to said body member axis; said planar surface being generally semi-elliptical in shape.

* * * * *